US012363352B2

(12) United States Patent
Harambillet et al.

(10) Patent No.: US 12,363,352 B2
(45) Date of Patent: Jul. 15, 2025

(54) MULTIMEDIA SERVER SUITABLE TO BE INSTALLED ON-BOARD AN AIRCRAFT, ASSOCIATED ENTERTAINMENT SYSTEM, METHOD AND COMPUTER PROGRAM

(71) Applicant: THALES, Courbevoie (FR)

(72) Inventors: Pierre Harambillet, Merignac (FR); François Michel, Merignac (FR); Jean-Vincent Lamberti, Merignac (FR)

(73) Assignee: THALES, Courbevoie (FR)

( * ) Notice: Subject to any disclaimer, the term of this patent is extended or adjusted under 35 U.S.C. 154(b) by 180 days.

(21) Appl. No.: 18/075,162

(22) Filed: Dec. 5, 2022

(65) Prior Publication Data
US 2023/0179806 A1 Jun. 8, 2023

(30) Foreign Application Priority Data

Dec. 6, 2021 (FR) ...................................... 21 13029

(51) Int. Cl.
*H04N 21/214* (2011.01)
*H04N 21/231* (2011.01)

(52) U.S. Cl.
CPC ... *H04N 21/2146* (2013.01); *H04N 21/23113* (2013.01)

(58) Field of Classification Search
CPC ...................... H04N 21/2146; H04N 21/23113
See application file for complete search history.

(56) References Cited

U.S. PATENT DOCUMENTS

| 9,226,000 | B1 * | 12/2015 | Knight | H04N 21/8352 |
| 10,097,879 | B1 * | 10/2018 | Bates | H04N 21/2181 |
| 11,492,119 | B1 * | 11/2022 | Watson | B64D 11/0015 |
| 2002/0007417 | A1 * | 1/2002 | Taylor | H04N 21/23116 |
| | | | | 725/87 |
| 2005/0086436 | A1 * | 4/2005 | Modha | G06F 12/124 |
| | | | | 711/170 |
| 2006/0069876 | A1 * | 3/2006 | Bansal | G06F 12/121 |
| | | | | 711/134 |

(Continued)

FOREIGN PATENT DOCUMENTS

| EP | 697660 A1 * | 2/1996 | .......... G06F 11/2094 |
| FR | 3 101 450 | 4/2021 | |

OTHER PUBLICATIONS

French Search Report dated Jun. 10, 2022, for FR Application No. 2113029, 2 pp.

*Primary Examiner* — James R Sheleheda
(74) *Attorney, Agent, or Firm* — NIXON & VANDERHYE

(57) ABSTRACT

Disclosed is a multimedia server on-board an aircraft including: a database including a permanent part and a temporary part, the temporary part being empty each time the aircraft takes off; a module for receiving a request from a terminal including a playback request for a multimedia file of interest; a processing module configured for checking whether the multimedia file of interest is present in the database; an external communication module configured for sending the request to an external system when the multimedia of interest is not present in the database and for receiving the multimedia file of interest and for storing same in the temporary part; and a module for sending the multimedia file of interest to the terminal.

8 Claims, 4 Drawing Sheets

(56) References Cited

U.S. PATENT DOCUMENTS

| | | | |
|---|---|---|---|
| 2010/0064327 A1* | 3/2010 | Lynch | H04N 21/23113 |
| | | | 725/76 |
| 2011/0088076 A1 | 4/2011 | Li et al. | |
| 2012/0110628 A1* | 5/2012 | Candelore | H04N 21/4621 |
| | | | 725/116 |
| 2012/0331089 A1* | 12/2012 | Vonog | H04L 65/60 |
| | | | 709/217 |
| 2013/0055321 A1* | 2/2013 | Cline | H04N 21/41422 |
| | | | 725/77 |
| 2016/0285942 A1* | 9/2016 | Funderburk | H04N 21/234309 |
| 2018/0069863 A1* | 3/2018 | Dalal | H04L 63/10 |
| 2018/0129447 A1* | 5/2018 | Kao | G06F 3/0685 |
| 2019/0100152 A1* | 4/2019 | Shastry | H04N 21/2146 |
| 2022/0377388 A1* | 11/2022 | Harambillet | H04N 21/23116 |
| 2023/0179806 A1* | 6/2023 | Harambillet | B64D 11/0015 |
| | | | 725/76 |

\* cited by examiner

MULTIMEDIA SERVER SUITABLE TO BE INSTALLED ON-BOARD AN AIRCRAFT, ASSOCIATED ENTERTAINMENT SYSTEM, METHOD AND COMPUTER PROGRAM

CROSS-REFERENCE TO RELATED APPLICATION(S)

This application claims priority to FR 21 13029 filed Dec. 6, 2021, the entire contents of which are hereby incorporated by reference.

BACKGROUND OF THE INVENTION

Field of the Invention

The present invention relates to a multimedia server suitable for being carried on-board an aircraft.

The invention further relates to an entertainment system comprising such a multimedia server.

The invention further relates to a playing method implemented by such a multimedia server.

The invention further relates to a computer program implementing such a method.

Description of the Related Art

The aircraft is in particular, suitable for carrying passengers in a cabin. The aircraft is e.g. a long-haul commercial aviation aircraft.

The aircraft comprises a plurality of entertainment user terminals. The multimedia server is connected to the on-board entertainment terminals via an on-board local area network in order to form an In-Flight Entertainment (IFE) system.

Every entertainment terminal is integrated e.g. into the passenger seat or into the seat in front of the passenger. Every entertainment terminal is, as a variant, a digital tablet or a smart phone.

Thus arranged, the entertainment terminals allow passengers to consult multimedia content during the flight (e.g. films, TV programs, games or music) and to be informed about the course of the flight (altitude, speed, current position, progress, etc.).

In some cases, the entertainment terminals can be further used for giving certain practical information relating e.g. to the airport of arrival and for broadcasting announcements made by the crew in audio and/or video form.

To be accessible to entertainment terminals, the digital content is first loaded onto the multimedia server. Multimedia content catalogs are increasingly large in terms of volume, and with increasing resolutions (2K, 4K, 8K etc.) and qualitative video standards (FIDR, FIDR10, FIDR10+, Dolby Vision), the necessary storage volume is constantly growing. Furthermore, to overcome hardware failures, each multimedia content is often stored several times in the storage space.

Issues of available storage space for the multimedia catalog follow therefrom. The scope of the multimedia catalog is thus necessarily limited and it is difficult to match the varied expectations of each passenger on the aircraft.

Systems which allow passengers to connect from the cell phones, tablets or computers thereof to an on-board Wi-Fi network are known. Hereinafter, a Wi-Fi network is a network which complies with all IEEE 802.11 standards.

The Wi-Fi network gives access to the Internet network via a satellite connection or via a ground-based antenna. Same is referred to as IFC (In-Flight Connectivity).

Such Internet access allows passengers to have access to video streaming platforms for the general public. However, such a solution presents the major pitfall of the very limited bandwidth, typically equal to about 40 Mbps for all the passengers of an aircraft.

Furthermore, the connection between the aircraft and the rest of the Internet is inconsistent in terms of availability and capacity. Being dependent on the equipment of the aircraft and its location on the planet, the connection is naturally variable.

There is thus a need to obtain a multimedia server suitable for the specificities and constraints of the aeronautical field and providing passengers with better accessibility to a wide multimedia catalog.

SUMMARY OF THE INVENTION

To this end, the invention provides a multimedia server suitable for being carried on-board an aircraft and suitable for communicating with a plurality of terminals carried on-board said aircraft via an on-board local area network, the multimedia server comprising:
- a database comprising a so-called permanent part and a so-called temporary part, the permanent part comprising at least one stored multimedia file, each multimedia file having its own resolution, the temporary part being empty each time the aircraft takes off;
- a reception module configured for receiving a request from one of the plurality of terminals, the request comprising a request to play a multimedia file of interest, from a passenger in the aircraft;
- a processing module configured for checking whether the multimedia file of interest is present in the permanent part or the temporary part of the database;
- an external communication module configured for transmitting said request to a system external to the aircraft when the multimedia file of interest is not present in the database, the external communication module being further configured for receiving the multimedia file of interest from the external system following the request and for storing same in the temporary part of the database; and
- a transmission module configured for transmitting the multimedia file of interest from the database to said terminal.

According to other advantageous aspects of the invention, the multimedia server comprises one or a plurality of the following features, taken individually or according to all technically possible combinations:
- a respective memory size is associated with each part of the database, the processing module being configured for varying the respective memory size of each part on each new flight of the aircraft;
- the multimedia server further includes an error module configured for issuing an error message when the external communication module does not receive the multimedia file of interest from the external system following the request and/or when the temporary part is full, the processing module being configured for varying the respective memory size of each part of the database depending on the number of error messages issued;
- where each multimedia file is associated with a replication rate representative of the number of copies of the multimedia file stored in the database, the replication rate of each multimedia file depending on the resolution thereof and on the part of the database wherein the file is stored, the processing module being configured for varying the replication rate of each multimedia file on each new flight of the aircraft;

the multimedia server further comprises an audience module configured for assigning to each multimedia file in the database, an audience indicator representative of the number of times the multimedia file is played by the terminals, the processing module being configured for moving, at the end of each flight, each multimedia file from the temporary part to the permanent part if the associated audience indicator is greater than a predetermined threshold value, or for deleting it otherwise;

each multimedia file is formed of a plurality of subparts, each subpart having its own resolution, the external communication module being configured for receiving each subpart of the multimedia file of interest independently of the other subparts of the multimedia file of interest, the transmission module being configured for transmitting each subpart of the multimedia file of interest to the terminal as soon as said subpart is received by the external communication module;

the processing module is configured for checking whether all of the subparts of a multimedia file in the temporary part have a resolution greater than a predetermined threshold resolution before moving the multimedia file from the temporary part to the permanent part, the external communication module being configured for sending to an external server, a request to download each subpart with a resolution at least equal to the predetermined threshold resolution when said subpart in the temporary part has a resolution lower than the predetermined threshold resolution.

The further subject matter of the invention is an entertainment system suitable for being carried on-board an aircraft and comprising a plurality of terminals and a multimedia server as defined hereinabove, the multimedia server being suitable for communicating with the plurality of terminals via an on-board local area network; each terminal being configured for sending a request to the multimedia server, the request comprising a request to play a multimedia file of interest, received from a passenger in the aircraft, each terminal being configured for receiving said multimedia file of interest following the request and for playing said multimedia file of interest.

The further subject matter of the invention relates to a method for playing a multimedia file on-board an aircraft, the aircraft comprising an entertainment system as defined hereinabove, the method being implemented by the multimedia server, the method comprising at least the following steps:

receiving a request from one of the plurality of terminals, the request comprising a request to play a multimedia file of interest, received from a passenger in the aircraft;

checking whether the multimedia file of interest is present in the permanent part or in the temporary part of the database;

transmitting said request to a system external to the aircraft when the multimedia file of interest is not present in the database, receiving the multimedia file of interest from the external system following the request and storage in the temporary part of the database;

transmitting the multimedia file of interest from the database to said terminal.

The invention further relates to a computer program comprising software instructions which, when executed by a computer, implement a method as defined above.

BRIEF DESCRIPTION OF THE DRAWINGS

The features and advantages of the invention will appear upon reading the following description, given only as an example, and making reference to the enclosed drawings, wherein.

DETAILED DESCRIPTION OF SOME EMBODIMENTS

Figure 1:
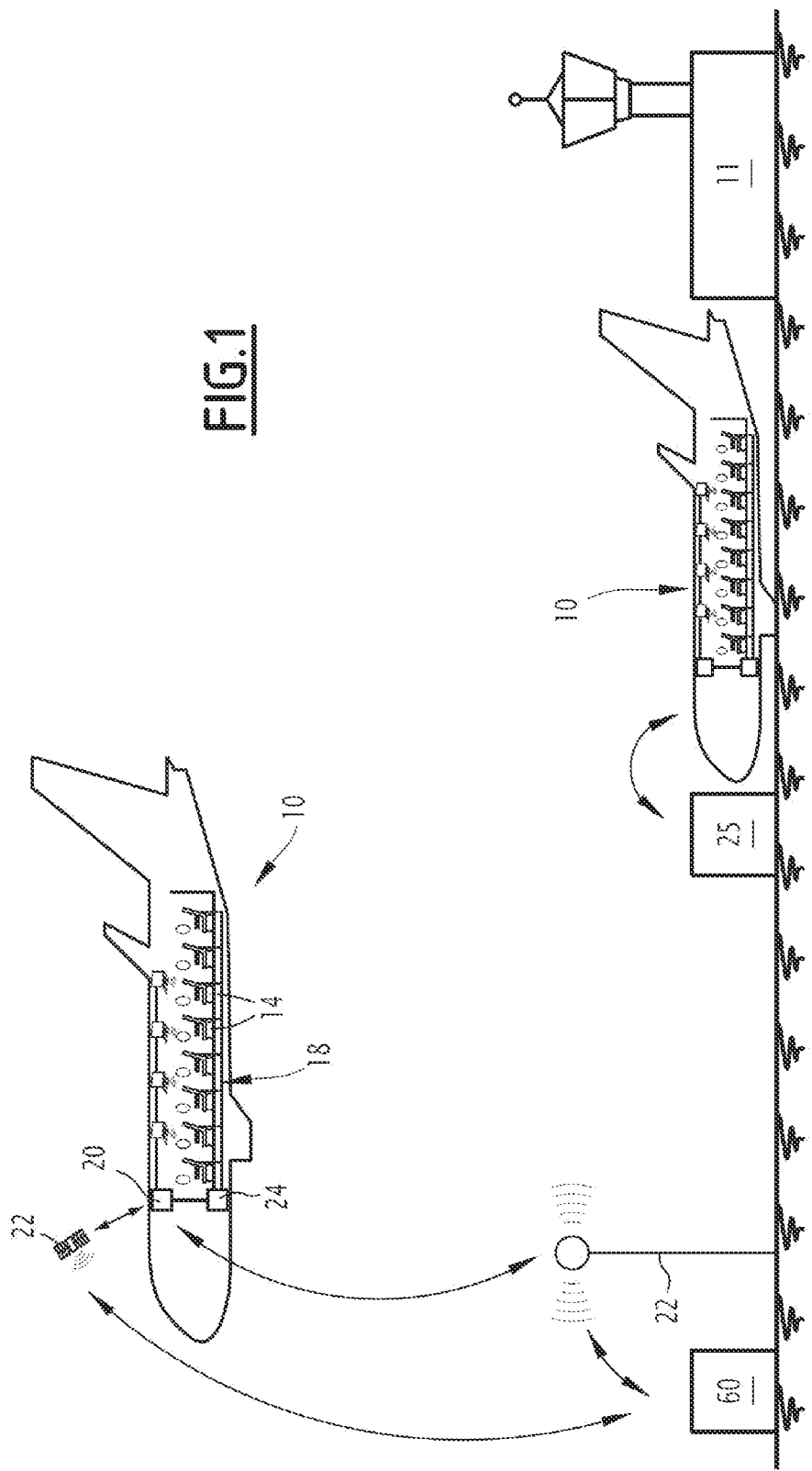
FIG. 1 is a schematic representation of two aircraft comprising a multimedia system according to the invention.

An aircraft 10 is shown in FIG. 1.

The aircraft 10 is configured for carrying passengers, in particular a few dozen passengers, or even a few hundred passengers.

The aircraft 10 is herein in particular, a commercial aviation aircraft, such as e.g. a long-haul aircraft.

The aircraft 10 is suitable for changing from a ground state to an in-flight state. On the ground, the aircraft 10 is in particular, parked in an airport 11. The aircraft 10 is suitable for taking off from the ground and changing to the in-flight state for connecting two airports 11 by air and carrying passengers.

The present invention is described hereinafter in the particular case of an aircraft. However, a person skilled in the art would understand that the present invention applies to any means of transporting passengers such as a railway vehicle, a cruise ship, a bus, etc.

Figure 2:
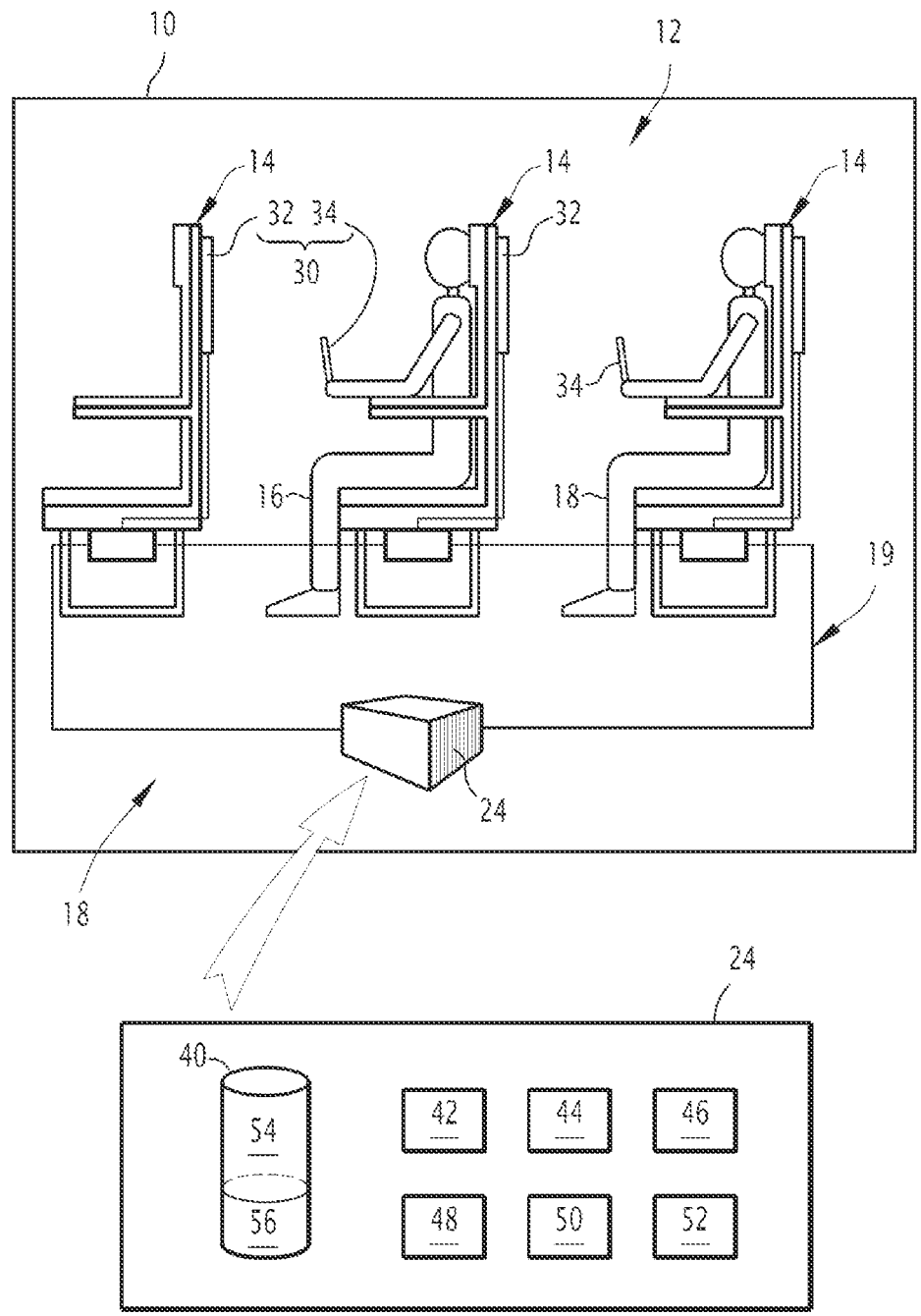
FIG. 2 is a schematic view of the inside of one of the aircraft shown in FIG. 1.

As can be seen in FIGS. 1 and 2, the aircraft 10 comprises a cabin 12 wherein a plurality of seats 14 are arranged for passengers 16.

The aircraft 10 further comprises an entertainment system 18.

The entertainment system 18 comprises a multimedia server 24 and a plurality of terminals 30.

The multimedia server 24 is suitable for communicating with the plurality of terminals 30 via an on-board local area network 19.

The transmission network 19 is advantageously connected to one or a plurality of communication systems 20. The communication system 20 is configured for establishing a connection with at least one antenna 22 arranged outside the aircraft 10.

As can be seen in FIG. 1, the antenna 22 is e.g. a satellite and/or a ground-based antenna. The communication system 20 is suitable for sending or receiving data from the antennas 22 and in particular can be used for connecting the transmission network 18 to the Internet network.

The communication system 20 is further configured for establishing a connection with ground content delivery equipment 25. Such connection is implemented only when the aircraft 10 is on the ground, parked in an airport 11, as shown in FIG. 1.

Each terminal 30 is in particular, a fixed entertainment terminal 32 of the mobile vehicle 10 or a portable electronic device 34.

The multimedia server 24 is advantageously connected by wire to each entertainment terminal 32.

As shown in FIG. 2, each entertainment terminal 32 is known per se and comprises in particular, a display screen, preferentially a touch screen. Each entertainment terminal 32 is e.g. fixed or integrated into the seat 14 of the passenger 16, or is fixed or integrated into the backrest of the seat 14 located in front of the seat 14 of the passenger 16.

Each entertainment terminal 32, also called a user terminal, includes a human-machine interface HMI, a processing module, an application module and a telecommunication module, which are not shown. The human-machine interface HMI includes in particular, a display screen. The application module comprises one or a plurality of application blocks. The telecommunication module includes a control block and one or a plurality of telecommunication interfaces suitable for sending and receiving data. The processing module is suitable for controlling and coordinating the operation of the application module, the human-machine interface HMI and the telecommunication module. In one embodiment, same includes a processor and a memory, e.g. a hard disk or any other storage space apt to store digital content received in particular, via the telecommunication module.

Each entertainment terminal 32 is suitable for delivering to the passengers, the content provided by the entertainment system 10. Following e.g. a selection by a passenger 16 of a field displayed on the screen of the HMI of the entertainment terminal 32 thereof, the processing module is suitable for identifying that a menu has to be displayed for selecting one of the applications, e.g. a list of films. Then, upon detection of the selection of a film by the passenger 16, the processing module is suitable for sending to the multimedia server 24, a playback request for the film, as will be explained hereinafter.

In addition to movies, the content delivered by the application is diverse: Multimedia content, e.g. movies, TV programs, games or music, flight parameters (altitude, speed, etc.) and the progress thereof (e.g. using a "moving map"), announcements (audio and/or video) made by the crew. The screen is apt to display images corresponding to digital content broadcast from the multimedia server 24. More precisely, the digital content is received via the telecommunication module from the multimedia server 24 in the form of streaming or else stored in the memory of the terminal 32, after having been downloaded beforehand from the multimedia server 24 via said telecommunication module.

The multimedia server 24 is advantageously wirelessly connected to each portable electronic device 34, in particular, via a Wi-Fi network.

Each portable electronic device 34 is typically a Personal Electronic Device (PED) belonging to a passenger 16. Each portable electronic device 34 is e.g. a smartphone or an electronic tablet.

The multimedia server 24 is configured for storing entertainment content and for communicating the entertainment content to the passengers 16 via the network 18. The multimedia server 24 comprises e.g. films, TV programs, games or music, and/or information on the course of the flight (altitude, speed, current position, progress, etc.).

As can be seen in FIG. 2, the multimedia server 24 comprises a database 40, a receiving module 42, a processing module 44, an external communication module 46 and a transmission module 48.

Advantageously, the multimedia server 24 further comprises an audience module 50 and an error module 52.

The database 40 comprises a so-called permanent part 54 and a so-called temporary part 56.

A respective size, in terms of memory, is associated with each part 54, 56 of the database 40.

Advantageously, the size of the permanent part 54 is larger than the size of the temporary part 56.

The permanent part 54 comprises at least one stored multimedia file.

Each multimedia file is in particular, a video file such as a movie. In a variant, the multimedia file is an audio file such as music or a text file such as a digital book.

Each multimedia file has its own resolution. The resolution is representative of the quality of the multimedia file.

The larger the resolution of a multimedia file, the larger the multimedia file in terms of the size of the data stored in the database 40.

The resolution of e.g. an image or a video, also called definition, is representative of the number of pixels which form the image. The resolution is in particular, called 480p for 720×480 pixels, 720p for 1280×720 pixels, 1080p for 1920×1080 pixels. 4K and 8K resolutions are also known, which refer to an ultra-high degree of definition (Ultra HD) of the image, i.e. a horizontal resolution of approximately 4000 and 8000 pixels, respectively.

As another example, the resolution of an audio file depends on the quantification (in bits), the sampling frequency, the data compression ratio of the file, etc.

A multimedia file is advantageously stored with several resolutions (e.g. a file in 4K resolution and a file in 1080p resolution).

The temporary part 56 is empty each time the aircraft 10 takes off. "Empty" means that the temporary part 56 does not contain any multimedia file.

As will be explained in more detail thereafter, the temporary part 56 is suitable for storing multimedia files downloaded during the flight. On each return to the ground, such files are deleted from the temporary part 56.

Each multimedia file is formed from a plurality of subparts, also called "chunks". Each subpart advantageously comprises a header making it possible to know the relationship of said subpart with the other subparts of the file, in particular the rank thereof.

Each subpart has its own resolution.

Thus, a multimedia file is possibly formed of subparts with different resolutions. The overall resolution of the multimedia file is equal to the smallest resolution of the different subparts.

Each multimedia file is further advantageously associated with a replication rate representative of the number of copies of said multimedia file stored in the database 40.

It is e.g. considered that multimedia content stored in the database 40 can be stored in one copy (replication rate equal to 1), in two copies (replication rate equal to 2) or in three copies (replication rate equal to 3).

Indeed, the connectivity of the aircraft with the ground is poor quality, unreliable and has uncertain availability. Thus, the management of storage failures takes place in the database 40 on-board the aircraft 10 because the re-acquisition of the data would be both much longer and especially not immediate. The above is achieved by the redundancy of the multimedia files.

A plurality of means of redundancy are envisaged.

Redundancy by simple duplication implies that the same multimedia file is copied several times on different physical disks, advantageously on different storage nodes.

Alternatively or in addition, the so-called "erasure coding" redundancy implies that additional data can be used for finding a missing data set by calculation. Such additional data make it possible to obtain a replication rate of 3 at the expense of using 1.5 times the space necessary for the storage of the datum. The payload data and the corresponding additional data are stored on separate storage nodes.

The replication rate of each multimedia file depends in particular on the resolution thereof.

In order to maintain a favorable balance between replication and the maximum usable storage capacity, certain high-resolution multimedia files are e.g. not duplicated (4K resolution e.g.) whereas multimedia files associated with lower resolutions (such as 1080p or 720p) are stored with a replication rate at least equal least 2 so as to ensure the integrity of the database 40 despite the occurrence of a hardware failure.

Furthermore, the replication rate of the multimedia files further depends on the part of the database 40 wherein the multimedia file is stored.

In particular, the replication rate of the multimedia files stored in the permanent part 54 is greater than the replication rate in the temporary part 56.

As an example, the files stored in the permanent part 54 have a replication rate at least equal to 2 and the files stored in the temporary part 56 have a replication rate at least equal to 1.

Alternatively, the files stored in the permanent part 54 have a replication rate at least equal to 3 and the files stored in the temporary part 56 have a replication rate at least equal to 2.

As will be explained thereafter, other criteria can influence the replication rate.

The receiver module 42 is configured for receiving a request sent by a terminal 30.

The request comprises a playback request for a multimedia file of interest, received from a passenger 16 of the aircraft 10.

In particular, the request is sent by the processing module of the terminal 30, e.g. following the selection, by the passenger 16, of the multimedia file of interest on the touch screen.

The processing module 44 is configured for checking whether the multimedia file of interest is present in the permanent part 54 or the temporary part 56 of the database 40.

When the multimedia file of interest is present in the database 40, the processing module 44 is configured for transmitting the file to the transmission module 48.

When the multimedia file of interest is not present in the database 40, the processing module 44 is configured for transmitting the request to the external communication module 46.

As will be explained in more detail thereafter, the processing module 44 is further configured for varying, in terms memory, the respective size of each part 54, 56 of the database 40 on each new flight of the aircraft 10.

Advantageously, the processing module 44 is further configured for varying the replication rate of each multimedia file on each new flight of the aircraft 10.

Various criteria are used by the processing module 44 such as e.g. the aircraft type 10. Indeed, a short-haul aircraft providing domestic connections across the United States and connected to a constellation of high-speed, high-availability satellites can maximize the storage space of the temporary part 56 and minimize the average replication rate, based on the principle that the connection with the outside will be relatively stable and available for accessing the multimedia files desired by the passengers 18.

In the case of a long-haul aircraft providing transatlantic links and connected to a satellite of low speed and low availability, on the other hand, the processing module 44 maximizes the permanent part 56 and applies replication rates greater than 2 so as to compensate for any hardware failure. Indeed, the quality of the connection with the outside of the aircraft 10 does not allow passengers to access multimedia files which are not stored in the database 40.

Other criteria include in particular, the type of connectivity of the aircraft 10 (Satcom GEO, Satcom MEO, Satcom LEO, A2G), the type of route used by the aircraft 10 (continental route, transoceanic route, mixed route) or the choice of paradigm (in particular the catalog volume required versus the content redundancy level) of the airline.

The external communication module 46 is configured for communicating with the outside of the aircraft 10 via the communication system 20.

The external communication module 46 is configured for transmitting the request to an external system 60 outside the aircraft 10 when the multimedia file of interest is not present in the database 40.

The external system 60 is in particular, a ground storage server comprising the entire multimedia catalog available for the passengers 16 of the aircraft 10.

The external communication module 46 is further configured for receiving, following the request, the multimedia file of interest from the external system 60.

The external communication module 46 is then configured for storing the multimedia file of interest in the temporary part 56 of the database 40.

In particular, the external communication module 46 is configured for receiving each subpart of the multimedia file of interest independently of the other subparts of the multimedia file of interest.

Figure 3:
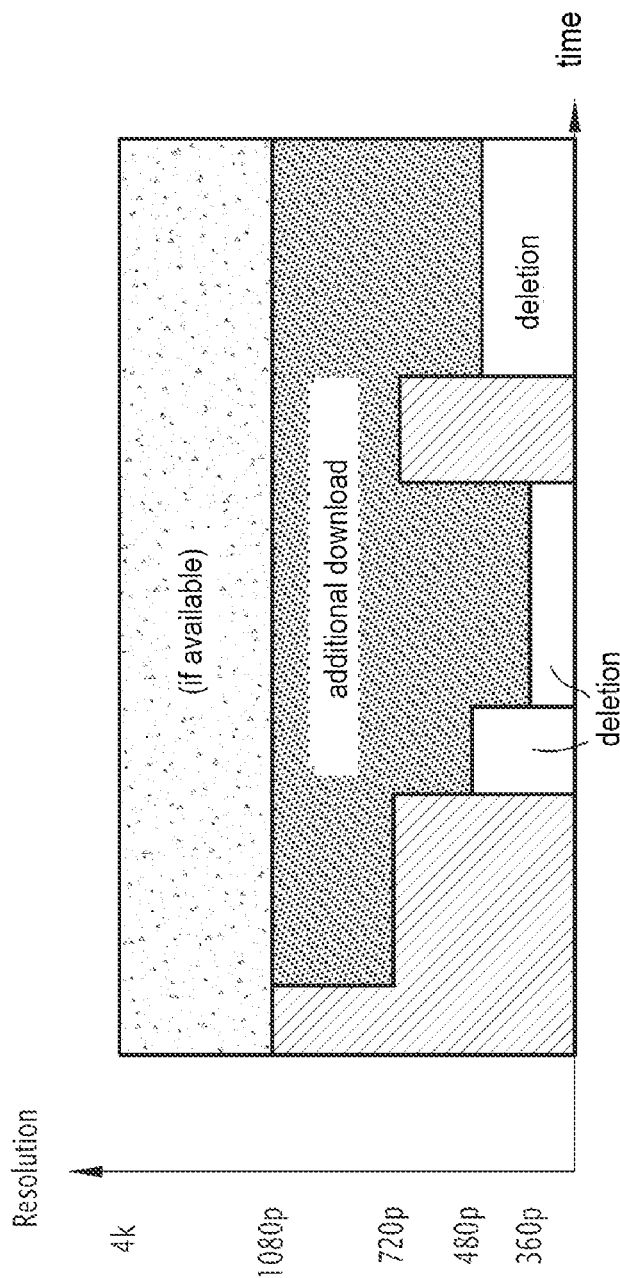
FIG. 3 is a graph showing an example of the resolution as a function of time for a downloaded multimedia file.

As illustrated in FIG. 3, depending on the connection available with the external server 60, each subpart is downloaded with its own resolution thereof. In particular, when the connection is stable and strong, the subparts are downloaded in high resolution (e.g. 1080p). Conversely, when the connection is unstable and relatively weak, the subparts are downloaded in low resolution (e.g. 360p or 480p).

The external communication module 46 is configured for transmitting each subpart of the multimedia file to the transmission module 48.

The transmission module 48 is configured for transmitting the multimedia file of interest from the database 40 to the entertainment terminal 30 which issued the request.

In particular, the transmission module 48 is configured for transmitting each subpart of the multimedia file of interest to the terminal 30 as soon as said subpart is received by the external communication module 46. Thus, the terminal 30 is suitable for playing the multimedia file in streaming.

The audience module 50 is configured for assigning to each multimedia file in the database 40, an audience indicator representative of the number of plays of said multimedia file by the terminals 30.

The audience module 50 is configured for collecting, for each multimedia file in the database 40, the current value of the audience indicator, which is representative of the number of plays of the multimedia file. A playback of the multimedia file is e.g. a view of the movie or a listening to music.

The audience indicator is kept from one flight to another but can advantageously comprise a damping coefficient of older playbacks with respect to the most recent playbacks of the multimedia file.

The audience indicator is advantageously weighted by the number of ratings "like", dislike" left by the passengers (example: number of reads x number of "likes"/number of "dislikes"), or by a ratio of playback time (e.g. average viewing time of content by passengers divided by the total time of the content).

The audience indicator is also advantageously weighted according to the type of flight (day/night), the flight context (flight duration among short/medium/long haul), the flight geography (departure airport, arrival airport), the seat class (business/economy/etc.), etc.

The processing module 44 is configured for moving, at the end of each flight, each multimedia file from the temporary part 56 to the permanent part 54 if the associated audience indicator is greater than a predetermined threshold value, or for deleting it otherwise.

In other words, the processing module 44 is configured for determining, as a function of the audience indicator, what will be the fate of the multimedia file within the temporary part 56, i.e. whether the file is to be deleted or kept, and, in the latter case, moved to the permanent part 54. The processing module 44 is then further configured for determining how many replications of the file are stored in the permanent part 54.

Advantageously, the processing module 44 is configured for moving, at the end of each flight, each multimedia file from the permanent part 54 if the associated audience indicator is less than a second predetermined threshold value, possibly equal to the preceding predetermined threshold value.

As an example, if a multimedia file downloaded and present in the temporary part 56, is played only once by a passenger 16 during the flight, the audience indicator thereof is low and the multimedia file is considered unlikely to be requested again by a passenger 16 of a next flight of the aircraft 10. The processing module 44 then removes it.

Conversely, if a multimedia file downloaded and present in the temporary part 56 is played a dozen times by various passengers 16 during the flight, the audience indicator thereof is high and the multimedia file is considered to have a high chance of being requested again by a passenger on a next flight. The processing module 44 then moves such multimedia file to the permanent part 54 so that same is available without downloading for the next flights.

In addition to the various criteria listed above, the replication rate of a multimedia file advantageously further depends on the audience indicator thereof.

Indeed, the replication rate of a file is thus adapted according to the popularity thereof and guarantees that the availability of a multimedia file which is very requested by the passengers 16, is not subject to the possible hardware failures of the database 40.

In an advantageous embodiment, when the aircraft 10 is on the ground, the processing module 44 is in particular, configured for checking, before moving the multimedia file from the temporary part 56 to the permanent part 54, whether all the subparts of a multimedia file in the temporary part 56 have a resolution greater than the predetermined threshold resolution.

When at least one subpart does not have a sufficient resolution with respect to the predetermined threshold resolution, the external communication module 46 is further configured for sending to an external server, e.g. the ground equipment 25, a request to download each subpart with a resolution at least equal to the predetermined threshold resolution when said subpart in the temporary part 56 has a resolution lower than the predetermined threshold resolution.

In the example shown in FIG. 3, the predetermined threshold resolution is 1080p. Thus, the external communication module 46 loads the missing portions amongst the required qualities so as to be able to offer same to passengers on subsequent flights with a resolution at least equal to the predetermined threshold resolution.

Once the subparts are downloaded at the resolution at least equal to the predetermined threshold resolution, the processing module 44 moves all of said subparts into the permanent part 54.

The error module 52 is configured for issuing an error message when the external communication module 46 does not receive the multimedia file of interest from the external system 60 following the request and/or when the temporary part 54 is full.

In particular, an error message is thus sent when the aircraft 10 crosses an area without access to the Internet network, e.g. when flying over an ocean, and the downloading of the multimedia files of interest requested by the external communication module 46 fails.

Furthermore, following multiple downloads of multimedia files of interest requested by the external communication module 46, the temporary part 56 of the database 40 is possibly full and the next downloads are impossible.

The number of error messages per flight is then recorded and the processing module 44 is configured for varying, in terms of memory, the respective size of each part 54, 56 depending on the number of error messages issued.

Thus, if the number of error messages issued is large, the processing module 44 increases e.g. the respective size of the temporary part 56 if the error messages are essentially due to a lack of storage space. Conversely, if the error messages are essentially due to connection loss problems, the respective size of the temporary part is reduced so as to have a larger catalog accessible in the permanent part 54 without the need for an Internet connection.

The operation of the multimedia server 24 will be explained in more detail thereafter, along with the description of a method for playing a multimedia file in the aircraft 10.

In the example shown in FIG. 2, the multimedia server 24 comprises an information processing unit consisting e.g. of a memory and of a processor associated with the memory. The receiver module 42, the processing module 44, the external communication module 46, the transmission module 48 and advantageously the audience module 50 and an error module 52 are each produced in the form of a software program, or a software brick, which can be run by the processor. The memory is then apt to store a receiving software, a speech-recognition software, a processing software, a surveillance software, and, as an optional addition, a transmission software and a validation software. The processor is then apt to run each of said software programs.

When the multimedia server 24 is produced in the form of one or a plurality of software programs, i.e. in the form of a computer program, same is further apt to be recorded on a computer-readable medium (not shown). The computer-readable medium is e.g. a medium apt to store the electronic instructions and to be coupled to a bus of a computer system. As an example, the readable medium is an optical disk, a magneto-optical disk, a ROM memory, a RAM memory, any type of non-volatile memory (e.g. EPROM, EEPROM, FLASH, NVRAM), a magnetic card or an optical card. A computer program containing software instructions is then stored on the readable medium.

Figure 4:
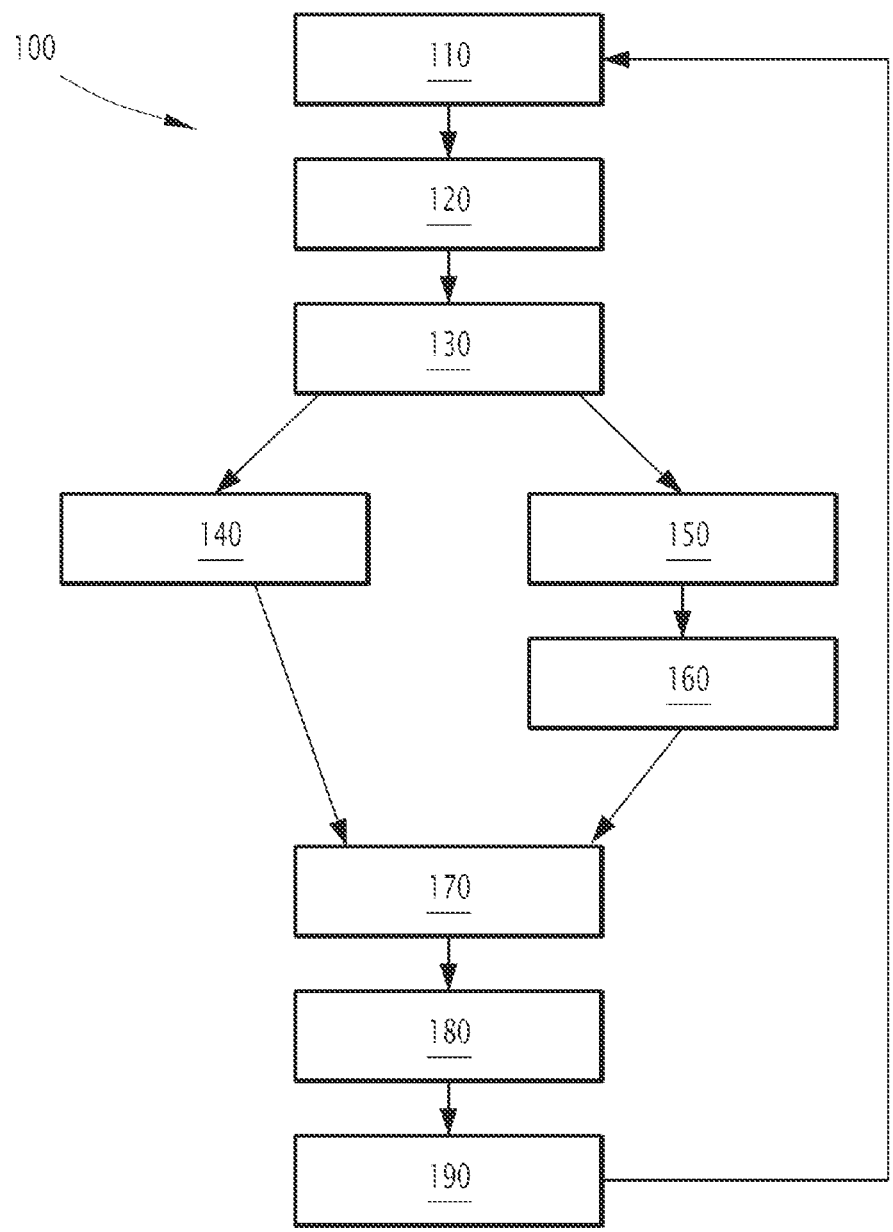
FIG. 4 is a flowchart of the method for playing a multimedia file according to the invention.

A playback method for a multimedia file 100 according to the invention will be henceforth explained with the help of FIG. 4 showing a flowchart of the playback method according to the invention.

Initially, the aircraft 10 is on the ground and parked at an airport 11 as shown in FIG. 1.

The external communication module 46 of the multimedia server 24 connects to a ground equipment 25, in particular a storage server of the complete multimedia catalog. The external communication module 46 downloads, if appropriate, new multimedia files which are stored in the permanent part 54 of the database 40 of the multimedia server 24. The temporary part 56 of the database 40 is empty.

Passengers 16 then enter the aircraft 10 and the latter takes off and flies to another airport 11 in order to transport the passengers 16.

During the flight, during a step 110, a passenger 16 selects from the catalog proposed, a multimedia file of interest that the passenger wishes to play by means of a terminal 30.

As illustrated in FIG. 2, the terminal 30 is either an entertainment terminal 32 arranged in particular, in the seat opposite said passenger 16, or a portable electronic device 34 of the passenger 16, in particular a telephone or a tablet connected to the multimedia server 24 by a Wi-Fi network.

The terminal 30 then transmits to the multimedia server 24, a request comprising a request for playing said multimedia file of interest.

Then, during an initial step 120, the multimedia module 24 receives a request issued by the terminal 30.

The method then comprises a step 130 of checking whether the multimedia file of interest is present in the permanent part 34 or the temporary part 56 of the database 40.

When the multimedia file of interest is present in the database 40, the processing module 44 then transmits said file to the transmission module 48 during a step 140.

When the multimedia file of interest is not present in the database 40, the processing module 44 transmits the request to the external communication module 46 during a step 150.

Following the step 150, the method comprises a step of transmitting said request to an external system 60 outside the aircraft 10.

Then, during a step 160, the external communication module 46 receives, following the request, the multimedia file of interest from the external system 60, and stores same in the temporary part 56 of the database 40.

In particular, as shown in FIG. 3, each subpart of the multimedia file of interest is downloaded with its own resolution thereof depending on the connection available with the external server 60.

In particular, when the connection is stable and strong, the subparts are downloaded in high resolution (e.g. 1080p). Conversely, when the connection is unstable and relatively weak, the subparts are downloaded in low resolution (e.g. 360p or 480p).

Following the step 140 or the step 160, the multimedia file of interest is transmitted from the database 40 to said terminal 30 during a step 170.

In particular, if the multimedia file of interest was already present in the permanent part 54 of the database 40, same is directly transmitted to the terminal 30.

If the multimedia file of interest was not initially present in the database 40, same is sent following the downloading thereof into the temporary part 56.

In particular, the transmission module 48 transmits each subpart of the multimedia file of interest to the terminal 30 as soon as said subpart is received by the external communication module 46.

The terminal 30 then plays the multimedia file.

In particular, the terminal 30 plays each subpart as same receives the subparts from the transmission module 48. Thus, the terminal 30 plays the multimedia file in streaming.

Subsequently, if another passenger 16 requests the playback of the same multimedia file of interest, the processing module 44 detects that same is already present in the temporary part 56 of the database 40. It is then not necessary to download same again and the multimedia file of interest is directly transmitted to the terminal 30, regardless of the connectivity of the aircraft 10 with the Internet network.

Then, when the aircraft 10 lands at the arrival airport, the aircraft 10 connects again via external communication module 46 thereof to ground equipment 25. The equipment 25 is possibly the same as when the aircraft 10 is parked in the departure airport.

At the end of each flight, during a step 180, the processing module 44 moves each multimedia file from the temporary part 56 to the permanent part 54 if the associated audience indicator is greater than a predetermined threshold value or otherwise deletes same.

Thus, if a multimedia file in the temporary part 56 has a low audience indicator, i.e. same has only been played a small number of times by the passengers 16 during the flight, the processing module 44 then deletes said multimedia file.

Conversely, if a multimedia file in the temporary part 56 has an audience indicator greater than the predetermined threshold value, i.e. the file has been played a significant number of times by the passengers 16 of the flight, the processing module 44 then moves the multimedia file to the permanent part 54. Such multimedia file will thus be available without downloading, for the next flights of the 10 aircraft.

In particular, as shown in FIG. 3, the processing module 44 checks whether all the subparts of a multimedia file in the temporary part 56, have a resolution higher than the predetermined threshold resolution, before moving the multimedia file from the temporary part 56 to the permanent part 54.

When at least one subpart does not have sufficient resolution with respect to the predetermined threshold resolution, the external communication module 46 sends to the ground equipment 25, a request to download each subpart with a resolution at least equal to the predetermined threshold resolution when said subpart in the temporary part 56 has a resolution lower than the predetermined threshold resolution.

In the example shown in FIG. 3, the predetermined threshold resolution is 1080 p. Thus, the external communication module 46 loads the missing portions among the required qualities so as to be able to offer same to passengers on subsequent flights with a resolution at least equal to the predetermined threshold resolution.

Once the subparts are downloaded at the resolution at least equal to the predetermined threshold resolution, the processing module 44 moves all of said subparts into the permanent part 54.

When several resolutions are stored in the database 40, the resolution files sufficient with respect to a predetermined quality standard, are kept. Here, 720p and 1080p resolution files are kept while 480p and 360p resolution files are deleted.

Advantageously, a resolution file additional to the threshold resolution is further downloaded. Here a 4K resolution file is downloaded if same is available in the ground equipment 25.

Alternatively, the processing module 44 considers only the overall resolution of the multimedia file, without taking into account, the granularity of resolution of the subparts. The same criteria then apply to the global resolution in order to trigger the downloading and the replacement of the entire multimedia file from the moment at least a subpart has a resolution lower than the threshold resolution.

Furthermore, during the step 180, the processing module 44 advantageously deletes, at the end of each flight, each multimedia file of the permanent part 54 if the associated audience indicator is less than a second predetermined threshold value, possibly equal to the preceding predetermined threshold value.

Thus, the multimedia files in the permanent part 54, which are little or not played by the passengers 16 during the last flights, are deleted from the permanent part 54 in order to free space for the files downloaded during the next flights and which are more likely to be requested by passengers.

Before the next flight of the aircraft 10, during a step 190, the processing module 44 varies, if appropriate, the respective size, in terms of memory, of each part 54, 56 of the database 40 on each new flight of the aircraft 10.

Advantageously, the processing module 44 further varies, if appropriate, the replication rate of each multimedia file before the next flight of the aircraft 10.

The criteria used by the processing module 44 are in particular, the aircraft type (short, medium or long haul), the type of connectivity (Satcom GEO, Satcom MEO, Satcom LEO, A2G) of the aircraft 10, the type of route used by the aircraft 10 (continental route, transoceanic route, mixed route) or the choice of paradigm (in particular the volume of catalog required versus the level of redundancy of the content) of the airline.

Then, the aircraft 10 takes off again and a new iteration of the method described hereinabove, is implemented.

It can be understood that the present invention has a certain number of advantages.

Indeed, the multimedia server according to the invention provides the passengers of the aircraft with a large multimedia catalog both stored in the on-board database and accessible by external download.

The multimedia server according to the invention is suited to the specificities and constraints of the aeronautical field, very different from the usual constraints of streaming, particularly due to the instability of the connection with the outside and to the finite number of passengers. The invention makes it possible to meet the quality standards of streaming platforms even in the event of poor connection quality.

The invention thus leads to an overall improvement in the quality of experience during the flight for passengers who have access to a wider and more relevant multimedia catalog due to the updates, on each new flight, of the content of the database.

Finally, the invention makes it possible to have control over the connectivity costs with the exterior of the aircraft by optimizing the content stored in the aircraft.

The invention claimed is:

1. A multimedia server suitable for being carried on-board an aircraft and suitable for communicating with a plurality of terminals carried on-board said aircraft via an on-board local area network,
the multimedia server comprising:
a database comprising a permanent part and a temporary part, the permanent part comprising at least one stored multimedia file, each multimedia file having its own resolution thereof, the temporary part being empty each time the aircraft takes off;
a receiving module executed by one or more processors and configured for receiving a request from one terminal of the plurality of terminals, the request comprising a playback request for a multimedia file of interest, from a passenger of the aircraft;
a processing module executed by the one or more processors and configured for checking whether the multimedia file of interest is present in the permanent part or in the temporary part of the database;
an external communication module executed by the one or more processors and configured for transmitting said request to a system external outside the aircraft when the multimedia file of interest is not present in the database, the external communication module being further configured for receiving the multimedia file of interest from the external system following the request and for storing the multimedia file of interest in the temporary part of the database;
a transmission module executed by the one or more processors and configured for transmitting the multimedia file of interest from the database to the terminal,
wherein a respective memory size is associated with each part of the database,
wherein the processing module is configured for varying the respective memory size of each part on each new flight of the aircraft; and
an error module executed by the one or more processors and configured for issuing an error message when the external communication module does not receive the multimedia file of interest from the external system, following the request and/or when the temporary part is full, the processing module being configured for varying the respective memory size of each part of the database according to the number of error messages issued by the error module.

2. The multimedia server according to claim 1, wherein each multimedia file is associated with a replication rate representative of the number of copies of said multimedia file stored in the database,
the replication rate of each multimedia file depending on the resolution thereof and of the part of the database wherein the file is stored,
the processing module being configured for varying the replication rate of each multimedia file on each new flight of the aircraft.

3. The multimedia server according to claim 1, further comprising an audience module executed by the one or more processors and configured for assigning to each multimedia file in the database, an audience indicator representative of the number of times said multimedia file is played by the terminals,
the processing module being configured for moving, at the end of each flight, each multimedia file from the temporary part to the permanent part if the associated audience indicator is greater than a predetermined threshold value, or for deleting the multimedia file otherwise.

4. The multimedia server according to claim 3, wherein each multimedia file is formed of a plurality of subparts, each subpart having its own resolution thereof, the external communication module being configured for receiving each subpart of the multimedia file of interest independently of the other subparts of the multimedia file of interest, the transmission module being configured for transmitting each subpart of the multimedia file of interest to the terminal as soon as the subpart is received by the external communication module, and wherein the processing module is configured for checking, before moving the multimedia file from the temporary part to the permanent part, whether all subparts of a multimedia file in the temporary part have a resolution greater than a predetermined threshold resolution, the external communication module being configured for sending to an external server, a request to download each subpart with a resolution at least equal to the predetermined threshold resolution when said subpart in the temporary part has a resolution lower than the predetermined threshold resolution.

5. The multimedia server according to claim 1, wherein each multimedia file is formed of a plurality of subparts, each subpart having its own resolution thereof, the external communication module being configured for receiving each subpart of the multimedia file of interest independently of the other subparts of the multimedia file of interest, the transmission module being configured for transmitting each subpart of the multimedia file of interest to the terminal as soon as the subpart is received by the external communication module.

6. An entertainment system suitable for being carried on-board an aircraft and comprising:
- a plurality of terminals;
- the multimedia server according to claim 1, the multimedia server being suitable for communicating with the plurality of terminals via an on-board local area network,
- each terminal being configured for sending a request to the multimedia server, the request including a playback request for a multimedia file of interest, received from a passenger in the aircraft,
- each terminal being configured for receiving said multimedia file of interest following the request and for playing said multimedia file of interest.

7. A playback method for a multimedia file on-board an aircraft, the aircraft comprising the entertainment system according to claim 6, the method being implemented by the multimedia server, the method comprising at least the following steps:
- receiving a request from one terminal from the plurality of terminals, the request comprising a playback request for a multimedia file of interest, received from a passenger in the aircraft;
- checking whether the multimedia file of interest is present in the permanent part or in the temporary part of the database;
- transmitting said request to an external system outside the aircraft when the multimedia file of interest is not present in the database,
- receiving the multimedia file of interest from the external system following the request, and storage in the temporary part of the database;
- transmitting the multimedia file of interest from the database to said terminal,
- associating the respective memory size with each part of the database, the processing module being configured for varying the respective memory size of each part on each new flight of the aircraft,
- with the error module, issuing the error message when the external communication module does not receive the multimedia file of interest from the external system, following the request and/or when the temporary part is full, and
- with the processing module, varying the respective memory size of each part of the database according to the number of error messages issued by the error module.

8. A non-transitory computer-readable medium on which is stored a computer program comprising software instructions which, when executed by a computer, cause the computer to implement the method according to claim 7.

* * * * *